United States Patent
Waidelich

[15] 3,646,760
[45] Mar. 7, 1972

[54] VAPOR CYCLE PROPULSION SYSTEM

[72] Inventor: Jack P. Waidelich, Bonita, Calif.

[73] Assignee: Rohr Corporation, Chula Vista, Calif.

[22] Filed: June 1, 1970

[21] Appl. No.: 41,925

[52] U.S. Cl. ............................ 60/204, 60/36, 60/262, 60/267
[51] Int. Cl. ........................................................ F02k 3/06
[58] Field of Search ............... 60/203, 262, 266, 267, 36, 60/204

[56] References Cited

UNITED STATES PATENTS

| | | | |
|---|---|---|---|
| 2,483,045 | 9/1949 | Harby | 60/267 |
| 2,974,495 | 3/1961 | Pinnes | 60/203 |
| 3,007,306 | 11/1961 | Martin | 60/267 |
| 3,016,694 | 1/1962 | Howarth | 60/36 |
| 3,542,152 | 11/1970 | Adamson | 415/119 |

FOREIGN PATENTS OR APPLICATIONS 243,957  2/1947  Switzerland ........................ 60/262

*Primary Examiner*—Douglas Hart
*Attorney*—George E. Pearson

[57] ABSTRACT

System comprises duct with entire power plant within a duct. Axial flow compressor driven by vapor turbine produces entire thrust in form of airflow. Combustor combines minor portion of airflow with fuel and burns mixture to produce heat for vaporizing suitable working fluid. Latter may be water, mercury, or one of the alkali metals. Vaporized fluid goes to turbine and operates it to drive compressor. Exhaust from turbine goes to condenser located in airflow so that all rejected heat is added to airflow within duct to increase its energy. The vaporizer and turbine may be located within a center body to conserve heat for shaft horsepower. Combustion gases mix with air within duct so there is no primary combustion gas jet. High velocity of airflow is still much lower than turbojet, producing considerable noise reduction. Lower temperature of air further reduces noise and makes possible maximum use of acoustic surfaces inside duct. All heat rejected or lost goes into airflow to produce maximum efficiency. High cycle efficiency results in low hydrocarbon exhaust emission.

15 Claims, 1 Drawing Figure

PATENTED MAR 7 1972 3,646,760
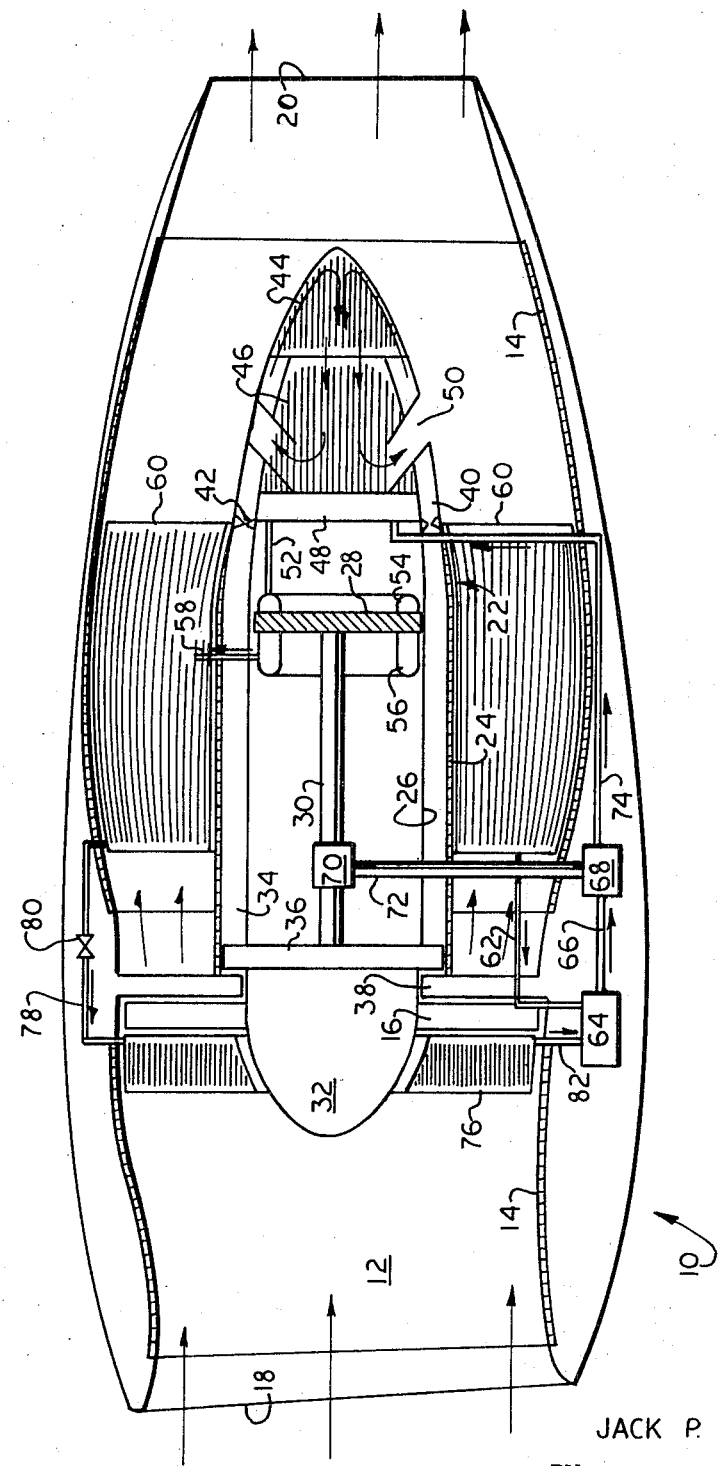
INVENTOR.
JACK P. WAIDELICH
BY
George B. Pearson
ATTORNEY

VAPOR CYCLE PROPULSION SYSTEM

BACKGROUND OF THE INVENTION

This invention lies in the field of jet propulsion engines which produce reaction thrust by ejecting a high-velocity stream of gas from a nozzle or duct. The conventional jet engine of the present time produces power by forcing very hot gaseous products of combustion through a turbine and ejecting the exhaust gas rearwardly to produce a reaction thrust. Such engines operate at the best efficiency available with the present state of the art and, in doing so, create a very high level of sound energy or "noise" in a wide range of frequencies, and a portion of this noise reaches the ground at an energy level which is not acceptable to the public.

The present invention is directed to a jet propulsion system which operates on a different principle which makes more efficient use of the power input, thus minimizing exhaust pollutants, and which eliminates the production of a primary turbine exhaust jet which produces much of the unacceptable noise level referred to above. Many advancements have been made in the conventional type jet engines in recent years. The fan type uses a large proportion of the turbine's power output in the form of shaft horsepower with a resultant increase in efficiency but the turbine exhaust is still sufficient to produce a very high sound level. Temperatures and pressures have been brought up to the limits of safe use of the turbines, producing high thrust-to-weight operation and increased efficiency, but these factors have also contributed to the high noise level. Attempts to reduce noise have been confined primarily to variations in nozzle configuration or addition of structures to modify jet flow. Hence, this type of engine has reached a virtual plateau in efficiency, thrust-to-weight ratio and noise emission.

SUMMARY OF THE INVENTION

The present invention provides a jet propulsion system of superior efficiency and substantially reduced noise level by the use of a different basic power cycle and a configuration of components to produce virtually the maximum possible specific shaft horsepower and by the reduction of the high-velocity turbine exhaust jet.

Generally stated, in the presently preferred form the system comprises a longitudinally extensive duct having a forward air inlet and an aft air outlet generally similar to those used with gas turbines, with airflow-producing means located within the duct. Substantially the entire jet issuing from the duct outlet is air which is forced through the duct by an axial flow compressor located within the duct. In the presently preferred form the compressor shaft is driven by vapor turbine means of the Rankine cycle type operated with vapor of water, mercury, or an alkali metal such as sodium or potassium.

A combustor is provided which uses a minor portion, which may be as low as 5 percent, of the airflow through the duct and combines it with suitable fuel to provide heat to a vaporizer or heat exchanger. Working fluid vaporized in this vaporizer is fed to a turbine which is in driving relation with the compressor shaft, and the exhaust vapor from the turbine then flows to a condenser located in the airflow through the duct, where it is condensed for return to the vaporizer or heat exchanger through a reservoir and pump. When water is the working fluid, the products of combustion may flow through a feedwater heater and a superheater to extract the maximum heat of combustion and minimize heat rejection.

While vapor turbine systems are not in themselves broadly new, it is new so far as known to locate the entire system within a confined airflow zone so that all of the heat rejected by the combustion gas flow and by the condenser is added to the airflow within the confined zone so that the added heat energy increases the total thrust. Moreover all heat generally radiated from the power components is also added to the airflow within the confined zone. Thus 100 percent of the heat energy produced by the combustor is used in mechanical work or is added to the airflow to obtain maximum propulsive efficiency. While the velocity of the airflow is high, it is much lower than that of a turbine exhaust jet and is also much cooler, both features contributing to the production of a much lower noise level. The energy of the combustion flow is greatly reduced by the heat transfer operation and its velocity is much lower than that of turbine exhaust gas, so it is dumped into the confined airflow and thus there is no primary combustion gas jet at the duct outlet. This further contributes to reduction of the noise level. The efficient utilization of heat input plus the low-pressure combustion process will minimize smog-producing pollutants.

The vapor cycle propulsion system of the present invention is ideally suited for use in combination with an air cushion tracked vehicle since it inherently operates as a source of air under pressure which may be used, by partial bleed off, for development of the support and guidance cushion for the vehicle as well as to provide the principal function of developing jet thrust for propulsion of the vehicle in open intercity areas. In the intracity areas, as at stations, which may be enclosed, the capability of the system of operation at low noise levels lends itself admirably for such application. The engine, moreover, may be operated at low throttle within the station area, and by use of a poser takeoff and reduction gearing to a bogie drive may provide sufficient horsepower to move the vehicle in and out of such station areas at moderate speeds, such as of the order of 30 miles per hour. The propulsion system of this invention, furthermore, is inherently quiet in operation and produces a minimum of unburned hydrocarbons with the result that its effluent is substantially pollution-free. The gain in pollution reduction ordinarily exceeds that of equivalent electrical propulsion systems which are clean in themselves but which receive their energy from generating stations which are usually a source of high air pollution.

BRIEF DESCRIPTION OF THE DRAWING

Various other advantages and features of novelty will become apparent as the description proceeds in conjunction with the accompanying drawing, in which:

The FIGURE is a schematic sectional view showing the various components and arrangement of the propulsion system.

DESCRIPTION OF PREFERRED EMBODIMENTS

A typical vapor cycle system incorporating the invention is illustrated in the single FIGURE, in which a longitudinally extending duct 10 having an inner wall 12 is provided on portions of said wall with acoustic surfaces 14 to absorb some of the noise generated by the airflow-producing means. An axial flow compressor 16 centered generally on the longitudinal axis of the duct produces a high-velocity, high-mass flow of air through the duct from its forward air inlet 18 to its aft air outlet 20 to produce a rearwardly directed propulsive jet.

The compressor is driven by a powerplant substantially completely housed within a generally cylindrical streamlined center body 22, which also is centered generally on the longitudinal axis of the duct. The center body may also have a portion of its external surface acoustically treated as indicated at 24. In the exemplary form which is schematically illustrated, a shell 26, spaced inwardly from the wall of the center body 22, surrounds a turbine 28 which is mounted to a drive shaft 30 as illustrated. Any suitable working fluid may be used in the turbine. The drive shaft is connected at its forward end to the rotatable nose body 32 which carries compressor 16. The center body 22 and shell 26 form between their forward portions a forward air passage 34 of generally annular cross section, and nose body 32 carries a partial stage fan or compressor 36 located aft of the stator 38 at the inlet to passage 34 to force a minor portion of the airflow in the duct rearwardly through the passage at increased pressure.

The aft portion of the annular space between center body 22 and shell 26 forms a combustor passage 40 in continuation of passage 34, and fuel is added at point 42. The products of combustion flow rearwardly into chamber 44, are reversed, and then flow forwardly as indicated by the arrows into a vaporizer 46. The gases flow forwardly into contact with feedwater heater 48 and then laterally through discharge passages 50, mixing with the airflow through the duct and adding their remaining heat energy thereto. Since there is no gas turbine, there is no primary jet to produce the usual extremely high noise levels.

The stream or vaporized fluid passes from vaporizer 46 through conduit 52 to header 54 and then through the turbine 28 to produce the motive power, exiting into header 56. The exhaust from turbine 28, containing the only remaining heat not used for mechanical work, passes from header 56 through conduit 58 to condenser 60 which is located in the airflow produced in the duct by compressor 16, and the heat of condensation is added to the energy of the airflow. The water condensed in condenser 60 then flows through conduit 62 to reservoir 64. From the reservoir it passes through conduit 66 to water pump 68, driven by shaft 30 through gearbox 70 and shaft 72, and thence through conduit 74 back to the feedwater heater 48. It will be noted that the turbine 28 and the vaporizer 46 are housed entirely within the center body 22 so there is practically no heat loss to the air and no drag in the airflow.

An auxiliary condenser 76, similar to condenser 60, is located ahead of compressor 16 and is flow-connected to condenser 60 by conduit 78 having a control valve 80. It is also provided with a condensate flow return conduit 82 leading to water reservoir 64. This secondary condenser may be cut in when necessary to provide extra cooling for high-load and high-temperature conditions. Both of these condensers may have suitable acoustic surfaces to absorb noise generated by the compressor and emitted axially forwardly and rearwardly. Since these condensers are exposed to airflow whenever the powerplant is in operation, they provide the necessary cooling for ground runup, etc., when there is no forward motion. This avoids the need for any type of ground cooling accessory.

It will be apparent that the system disclosed herein produces jet thrust propulsion at reduced noise levels because the jet exhaust is cooler than that of a gas turbine and its velocity is less than that of a gas turbine. It is highly efficient because it produces a maximum of mechanical work per unit of fuel and a minimum of heat discharge. This coupled with the feature of low-pressure combustion, will result in less hydrocarbon and nitro-oxygen emissions. Moreover all of the radiated or rejected heat energy is added to the airflow within a confined zone to increase the net thrust. The system may be used with a single water-steam or other vapor cycle with considerable benefit because no heat is wasted. It is also possible to use the rejected heat for anti-icing, cabin heating, etc., in suitable installations, thus reducing the number of accessory heating devices which must be provided for modern airplanes.

Having described the invention, what is claimed as new and useful and desired to be secured by U.S. Letters Patent is:

1. A jet propulsion system comprising: a longitudinally extensive primary duct having a forward air inlet and an aft air outlet, and airflow-producing means located entirely within said duct; said means including axial flow compressor means and vapor turbine means for driving the compressor means; vaporizable working fluid means for operation of the turbine means; heating means for vaporizing the working fluid means; and condenser means flow-connected to the turbine means and located in the airflow through the primary duct and serving to liquefy vapor exhausted from the turbine means and transfer the heat of condensation to the airflow to increase its energy content; said heating means including a heat exchanger for vaporizing at least some of the working fluid means; the heat exchanger being located entirely within the primary duct and being segregated from the airflow through the primary duct; a secondary duct to segregate a portion of the airflow produced by the compressor means; combustion means in the secondary duct to combine the airflow therein with fuel to supply heat to the heat exchanger; and means to discharge the products of combustion to the airflow within the primary duct upstream of its outlet to add its remaining heat energy to the air prior to discharge of the air from the primary duct outlet.

2. A system as claimed in claim 1; said condenser means being located downstream of the compressor means to add its heat energy to the air after it has passed through the compressor means.

3. A system as claimed in claim 2; said condenser means having acoustically treated surfaces to absorb a portion of the noise generated by the compressor means.

4. A system as claimed in claim 2; and second condenser means located within said duct upstream of the compressor means and adapted to be flow-connected to the exhaust from the turbine means to provide additional cooling during high-power and high-temperature conditions.

5. A system as claimed in claim 4; said second condenser means also having acoustically treated surfaces to absorb a portion of the noise generated by the compressor means and emitted in an axially forward direction.

6. A system as claimed in claim 1; and portions of the walls of the flow-producing means and of the inner wall of the duct being provided with acoustic surfaces to absorb some of the noise generated by the airflow-producing means.

7. A system as claimed in claim 1; said vaporizable working fluid means consisting of a single fluid; said vapor turbine means consisting of a single vapor turbine compatible with said single fluid; and said heat exchanger for vaporizing said single fluid consisting of a single heat exchanger compatible with said single fluid.

8. A system as claimed in claim 7; said vaporizable working fluid means consisting of water.

9. A system as claimed in claim 7; said vaporizable working fluid means consisting of mercury.

10. A system as claimed in claim 7; said vaporizable working fluid means consisting of one of the alkali metals.

11. A jet propulsion system comprising: a longitudinally extensive duct having a forward air inlet and an aft air outlet; an elongate center body having a central longitudinal axis substantially centered on the longitudinal axis of the duct and located entirely within the duct; an axial flow compressor located within the duct to produce airflow from the inlet to the outlet thereof; power supply means for driving the compressor; said power supply means being located within the center body; said power supply means including a combustor to supply heated products of combustion; a heat exchanger to receive the products of combustion; conduit means connected to said heat exchanger for flow of vaporizable working fluid to the heat exchanger and flow of vaporized working fluid therefrom; vapor turbine means connected in driving relation to said compressor; said conduit means being also connected to said turbine means to deliver vaporized working fluid thereto; means to discharge the products of combustion from said heat exchanger into the airflow within the duct; and condenser means located in the airflow through the duct and serving to liquefy vapor exhausted from the turbine means and transfer the heat of condensation to the airflow to increase its energy content.

12. A system as claimed in claim 11; said condenser means extending at least partially across said duct and being located downstream of the compressor to add its heat energy to he air after it has passed through the compressor.

13. A system as claimed in claim 12; and second condenser means extending at least partially across said duct upstream of the compressor and adapted to be flow-connected to the exhaust from the turbine means to provide additional cooling during high-power and high-temperature conditions.

14. A system as claimed in claim 11; and acoustic surfaces on portions of the outer wall of the center body and the inner wall of the duct to absorb sound generated by the compressor.

15. A method of producing propulsive jet thrust with maximum efficiency, minimum pollutant emission, and minimum noise emission, comprising: producing a high-velocity primary axial flow of air; passing said flow through a confined zone having an inlet and an outlet; segregating a minor portion of the air from said primary flow; combining said minor portion of said air with fuel and combusting the mixture separate from said primary flow; applying the heat of combustion to a vaporizable working fluid power system within said zone; utilizing said power system within said zone to produce said primary flow of air; and transferring all of the waste heat emitted by said power system to the air within said zone prior to its discharge from said outlet.

* * * * *